United States Patent
Asadullah et al.

(10) Patent No.: US 9,760,369 B2
(45) Date of Patent: Sep. 12, 2017

(54) ASSESSING MODULARITY OF A PROGRAM WRITTEN IN OBJECT ORIENTED LANGUAGE

(71) Applicant: Infosys Limited, Bangalore (IN)

(72) Inventors: Allahbaksh Mohammedali Asadullah, Hubli (IN); Basava Raju Muddu, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/106,449

(22) Filed: Dec. 13, 2013

(65) Prior Publication Data
US 2015/0169323 A1  Jun. 18, 2015

(51) Int. Cl.
*G06F 9/44* (2006.01)

(52) U.S. Cl.
CPC ........................... *G06F 8/77* (2013.01)

(58) Field of Classification Search
CPC ........... G06F 11/3616; G06F 8/70; G06F 8/77
USPC ........................................ 717/120, 142–143
See application file for complete search history.

(56) References Cited

U.S. PATENT DOCUMENTS

| | | |
|---|---|---|
| 5,640,558 A | 6/1997 | Li |
| 5,802,334 A | 9/1998 | Nickolas et al. |
| 5,832,500 A | 11/1998 | Burrows |
| 6,275,979 B1 * | 8/2001 | Graser ................. G06F 8/24 707/999.103 |
| 6,295,542 B1 | 9/2001 | Corbin |
| 6,314,559 B1 | 11/2001 | Sollich |
| 6,643,641 B1 | 11/2003 | Snyder |
| 6,728,752 B1 | 4/2004 | Chen et al. |
| 6,839,702 B1 | 1/2005 | Patel et al. |
| 6,976,243 B2 | 12/2005 | Charisius et al. |
| 6,993,710 B1 | 1/2006 | Coad et al. |
| 7,137,112 B2 | 11/2006 | Lovvik et al. |
| 7,454,744 B2 | 11/2008 | Bhogal et al. |
| 7,505,964 B2 | 3/2009 | Tong et al. |
| 7,536,408 B2 | 5/2009 | Patterson |
| 7,577,939 B2 | 8/2009 | Bayardo et al. |
| 7,584,453 B2 | 9/2009 | Bayardo, Jr. et al. |
| 7,594,222 B2 | 9/2009 | Horwitz et al. |
| 7,860,823 B2 * | 12/2010 | Hejlsberg ............ G06F 17/3041 707/603 |
| 8,146,058 B2 | 3/2012 | Sarkar et al. |
| 8,209,665 B2 | 6/2012 | Rama et al. |
| 8,392,443 B1 | 3/2013 | Allon et al. |
| 8,566,787 B2 | 10/2013 | Maskeri Rama et al. |

(Continued)

OTHER PUBLICATIONS

Chestnutt,CodeGaffe: Avoid .NET "partial" classes in C# and VB, Apr. 5, 2006, pp. 1-6.*

(Continued)

*Primary Examiner* — Duy Khuong Nguyen
(74) *Attorney, Agent, or Firm* — Klarquist Sparkman, LLP

(57) ABSTRACT

The technique relates to a system and method for assessing modularity of a program written in an object oriented language. This technique involves receiving information related to modularization of the program written in the object oriented language. Then the modularization of the program is assessed by calculating object encapsulation metrics, partial types metrics, extension method metrics, delegates metrics and static variable usage metrics. Further, an assessment report of the modularization is generated with respect to the said metrics.

16 Claims, 3 Drawing Sheets

(56) References Cited

U.S. PATENT DOCUMENTS

| | | | |
|---|---|---|---|
| 8,566,789 | B2 | 10/2013 | Siddaramappa et al. |
| 2004/0194141 | A1 | 9/2004 | Sanders |
| 2005/0097508 | A1 | 5/2005 | Jacovi et al. |
| 2005/0278695 | A1 | 12/2005 | Synovic |
| 2006/0150146 | A1* | 7/2006 | Meijer .................. G06F 9/4433 717/108 |
| 2007/0050343 | A1 | 3/2007 | Siddaramappa et al. |
| 2007/0118542 | A1 | 5/2007 | Sweeney |
| 2007/0250810 | A1 | 10/2007 | Tittizer et al. |
| 2007/0299825 | A1 | 12/2007 | Rush et al. |
| 2008/0086451 | A1 | 4/2008 | Torres et al. |
| 2008/0127034 | A1 | 5/2008 | Pasricha et al. |
| 2008/0148225 | A1* | 6/2008 | Sarkar et al. .................. 717/107 |
| 2008/0155508 | A1 | 6/2008 | Sarkar et al. |
| 2008/0196014 | A1* | 8/2008 | Kulkarni et al. ............. 717/136 |
| 2008/0243778 | A1 | 10/2008 | Behnen et al. |
| 2008/0301639 | A1 | 12/2008 | Bell et al. |
| 2009/0007065 | A1 | 1/2009 | Becker |
| 2009/0030659 | A1* | 1/2009 | Beckman et al. ................. 703/2 |
| 2009/0058847 | A1 | 3/2009 | Lewis |
| 2009/0077091 | A1 | 3/2009 | Khen et al. |
| 2009/0119576 | A1 | 5/2009 | Pepper et al. |
| 2009/0178031 | A1 | 7/2009 | Zhao |
| 2009/0198689 | A1 | 8/2009 | Frazier et al. |
| 2010/0070949 | A1* | 3/2010 | Rama et al. .................. 717/125 |
| 2010/0131517 | A1 | 5/2010 | Huang et al. |
| 2011/0161932 | A1* | 6/2011 | Nagappan ........... G06F 11/3616 717/122 |
| 2011/0231828 | A1* | 9/2011 | Kaulgud ............. G06F 11/3616 717/131 |
| 2011/0295903 | A1 | 12/2011 | Chen |
| 2012/0101929 | A1 | 4/2012 | Howard |
| 2012/0117459 | A1 | 5/2012 | DeHaven et al. |
| 2012/0166174 | A1 | 6/2012 | Lipetskaia |
| 2012/0246610 | A1 | 9/2012 | Asadullah et al. |
| 2012/0254162 | A1 | 10/2012 | Asadullah et al. |
| 2012/0254835 | A1 | 10/2012 | Muddu et al. |
| 2013/0226916 | A1 | 8/2013 | Dredze et al. |

OTHER PUBLICATIONS

Stackoverflow,"Would you abstract your LINQ queries into extension methods",Jun. 8, 2011, pp. 1-3.*

Mehra, "Extension Methods in C#", Aug. 31, 2009, pp. 1-9.*

CodeRun, "CodeRun Studio: A free, cross-platform browser-based IDE," <http://www.coderun.com/studio/> 3 pages (accessed Mar. 10, 2011).

Nikitin, Microsoft, "Development Environment as a Service," P.com No. IPCOM000145426D, Original Publication Date: Jan. 16, 2007, copyright 2006 Microsoft, 8 pages.

Storey et al., University of Victoria BC, Canada and IBM Canada, "Improving the Usability of Eclipse for Novice Programmers," Proceeding eclipse '03 Proceedings of the 2003 OOPSLA workshop on eclipse technology eXchange, pp. 35-39, ACM New York, NY USA copyright 2003, 5 pages.

"360 Search Results Clustering | Serials Solutions" http://www.serialsolutions.com/360-search-results-clustering, visited Mar. 7, 2011, 3 pages.

"iBoogie—MetaSearch Document Clustering Engine and Personalized Search Engines Directory" http://www.iboogie.com/text/about.asp, visited Mar. 7, 2011, 3 pages.

"Information Visualization for Search Interfaces (Ch 10) | Search User Interfaces" from the book "Search User Interfaces," Published by Cambridge University Press, Copyright 2009, http://searchuserinterfaces.com/book/sui_ch10_visualization.html, visited Mar. 7, 2011, 58 pages.

"MOSS Faceted search" msdn archive, Nov. 1, 2010, 2 pages.

"Drupal: Faceted Search," drupal.org/project/faceted_search, May 19, 2007, 3 pages.

Code Monkey, "Faceted search," raverly.com, Sep. 2010, 2 pages.

Krugler et al., "Search-driven development: Five reasons why search is your most powerful tool," LinuxWorld.com, Jan. 29, 2007, http://www.networkworld.com/news/2007/012907-search.html, 4 pages.

"The 4 Hidden Costs of Code Maintenance," White Paper at Krugle.com, Sep. 2008, 9 pages.

Carrot2, http://project.carrot2.org/index.html, archived on Mar. 10, 2011, 2 pages.

Codase, http://www.codase.com, Copyright 2009, archived on Mar. 9, 2011, 1 page.

Google code search, http://www.google.com/codesearch, visited Mar. 8, 2011, 3 pages.

Jexample. http://www.jexamples.com, archived on Mar. 5, 2011, 1 page.

Koders. http://www.koders.com, archived Mar. 9, 2011, 1 page.

Krugle. http://www.krugle.com, archived Mar. 8, 2011, 1 page.

Atkinson et al. "Effective Pattern Matching of Source Code Using Abstract Syntax Patterns," Software Practice Exper., 36:413-447, 2006, 35 pages.

Begel, "Codifier: A Programmer Centric Search User Interface," Workshop on Human-Computer Interaction and Information Retrieval, 2007, 2 pages.

Chatterjee et al., "SNIFF: A Search Engine for Java Using Free Form Queries," Proceedings of 12th International Conference on Fundamental approach to Software engineering, 2009, 16 pages.

Devanbu, "Genoa: A Customizable Language and Front End Independent Code Analyzer," Proceedings of ICSE (Melbourne, Australia), 1992, 11 pages.

Devanbu et al., "Lassie: A Knowledge-Based Software Information System," 12th International Conference on software Engineering, 1990, 15 pages.

Mandelin et al., "Jungloid Mining: Helping to Navigate the Api Jungle," Programmable Language Design and Implementation, 2005, 14 pages.

Stylos et al., "A Web Search Tool for Finding API Components and Examples," IEEE Symposium on VL and HCC, 2006, 8 pages.

Keivanloo et al., "SE-CodeSearch: A Scalable Semantic Web-Based Source Code Search Infrastructure," aseg.cs.concordia.ca, 2010, 5 pages.

Erlikh, Leveraging Legacy System Dollars for E-Business, IT Pro, pp. 17-23, May/Jun. 2000.

Grechanik et al., "A Search Engine for Finding Highly Relevant Applications," Proceedings of 32nd ACM/IEEE International Conference on Software Engineering 2010, 2010, 10 pages.

Inoue et al. "Ranking Significance of Software Components Based on Use Relations," IEEE Transactions on Software Engineering, vol. 31, No. 3, pp. 213-225, Mar. 2005.

Hummel et al., "Code Conjurer: Pulling Resuable Software Out of Thin Air," IEEE Software, pp. 45-52, Sep./Oct. 2008.

Maskeri et al. "Mining Business Topics in Source Code Using Latent Dirichlet Allocation," 1st India Software Engineering Conference, Hyderabad, India, Feb. 19-22, 2008, 9 pages.

Reiss, "Semanticcs-Based Code Search," International Conference on Software Engineering, 2009, 11 pages.

Hoffman et al. "Assieme: Finding and Leveraging Implicit References in a Web Search Interface for Programmers," Proceedings of the 20th annual ACM symposium on User interface software and technology, Oct. 7-10, 2007, Newport, Rhode Island, 2007, 10 pages.

Holmes et al., "Using Strucutral Context to Recommend Source Code Examples," Proceedings of the 5th International conference on Software Engineering, May 15-21, 2005, St. Louis, Missouri, 9 pages.

Thumalapenta et al. "PARSEWeb: Programmer Assistant for Reusing Open Source Code on the Web," International conference on Automated Software Engineering, Nov. 4-9, 2007, Atlanta, Georgia 2007, 10 pages.

Sahavechaphan et al., "XSnippet: Mining for Sample Code," OOPSLA 2006, 2006, 19 pages.

Bajracharya et al., "Sourcerer: A Search Engine for Open Source Code Supporting Structure Based Search," Proceedings of 21st conference on Object oriented programming, Systems, Languages and Applications, Oct. 22-26, 2006, Portland, Oregon, 2 pages.

(56) References Cited

OTHER PUBLICATIONS

Henninger, "Supporting the Construction and Evolution of Component Repositories," *International Conference on Software Engineering*, pp. 279-288, 1996.
Sillito et al., "Questions Programmers Ask During Software Evolution Tasks," *Proceedings of the 14th ACM SIGSOFT International Symposium on Foundations of Software Engineering*, Nov. 5-11, 2006, Portland, Oregon, 2006, 11 pages.
Paul et al., "A Framework for Source Code Search Using Program Patterns," *IEEE Trans. Software Engineering*, vol. 20, No. 6, pp. 463-475, Jun. 1994.
Ye et al., "Supporting Reuse by Delivering Task Relevant and Personalized Information," *International Conference on Software Engineering*, Buenos-Aires, Argentina, May 19-25, 2002, 11 pages.
Brito e Abreu et al., "A Coupling-Guided Cluster Analysis Approach to Reengineer the Modularity of Object-Oriented Systems," IEEE Conference on Software Maintenance and Reengineering, 2000, 10 pages.
Abdeen et al., "Modularization Metrics: Assessing Package Organization in Legacy Large Object-Oriented Software," inria-00614583, version 1, Aug. 12, 2011, 11 pages.
Emanuel et al., "Modularity Index Metrics for Java-Based Open Source Software Projects," *International Journal of Advanced Computer Science and Applications*, vol. 2, No. 11, 2011, 7 pages.
Sharafi et al., "Using Architectural Patterns to Improve Modularity in Software Architectural Design," *2012 International Conference on Software and Computer Applications (ICSCA 2012)* Singapore, IPCSIT vol. 41, Jun. 2012, 6 pages.

* cited by examiner

ASSESSING MODULARITY OF A PROGRAM WRITTEN IN OBJECT ORIENTED LANGUAGE

FIELD

The field relates generally to assessment of modularity of a program, and in particular, to a system and method for assessing modularity of a program written in object oriented language which supports object encapsulation, partial classes, class extension, delegates and usage of static variables.

BACKGROUND

Software modularization is used to maintain the systems modular as part of software maintenance. There are a few assessment frameworks available for measuring the existing modularity of the systems in C and Java. But, there are a few object oriented programming languages that have more rich features than C and Java. These features include object encapsulation, partial classes, class extension, delegates and usage of static variables. The existing modularity metrics tools measure the structural complexity and code dependencies with respect to standard object oriented features of Java. However, the existing metrics and tools are not adequate for assessing modularity of a program written in a language that supports object encapsulation, partial classes, class extension, delegates and usage of static variables.

SUMMARY

The present technique overcomes the above mentioned limitation by using object encapsulation metrics, partial type metrics, extension method metrics, delegates metrics and static variable usage metrics for assessing modularity of an object oriented language, such as C# language.

According to the present embodiment, a method for assessing modularity of a program written in an object oriented language is disclosed. The method includes receiving information related to modularization of the program written in the object oriented language. Thereafter, the modularization of the program is assessed by calculating object encapsulation metrics, partial types metrics, extension method metrics, delegates metrics and static variable usage metrics. Further, an assessment report of the modularization is generated with respect to the said metrics.

In an additional embodiment, a system for assessing modularity of a program written in an object oriented language is disclosed. The system includes an information receiver, a modularization assessor and a report generator. The information receiver is configured to receive information related to modularization of the program written in the object oriented language. The modularization assessor is configured to assess the modularization of the program by calculating object encapsulation metrics, partial types metrics, extension method metrics, delegates metrics and static variable usage metrics. The report generator is configured to generate an assessment report of the modularization with respect to the said metrics.

In another embodiment, a computer readable storage medium for assessing modularity of a program written in an object oriented language is disclosed. The computer readable storage medium which is not a signal stores computer executable instructions for receiving information related to modularization of the program written in the object oriented language, assessing the modularization of the program by calculating object encapsulation metrics, partial types metrics, extension method metrics, delegates metrics and static variable usage metrics and generating an assessment report of the modularization with respect to the said metrics.

DRAWINGS

Various embodiments of the invention will, hereinafter, be described in conjunction with the appended drawings. There is no intention to limit the scope of the invention to such blocks or objects, or to any particular technology. Instead these simplified diagrams are presented by way of illustration to aid in the understanding of the logical functionality of one or more aspects of the instant disclosure and is not presented by way of limitation.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a system and method for assessing modularity of a program written in an object oriented language. This involves receiving information related to modularization of the program written in the object oriented language. Then the modularization of the program is assessed by calculating object encapsulation metrics, partial types metrics, extension method metrics, delegates metrics and static variable usage metrics. Further, an assessment report of the modularization is generated with respect to the said metrics.

Figure 1:
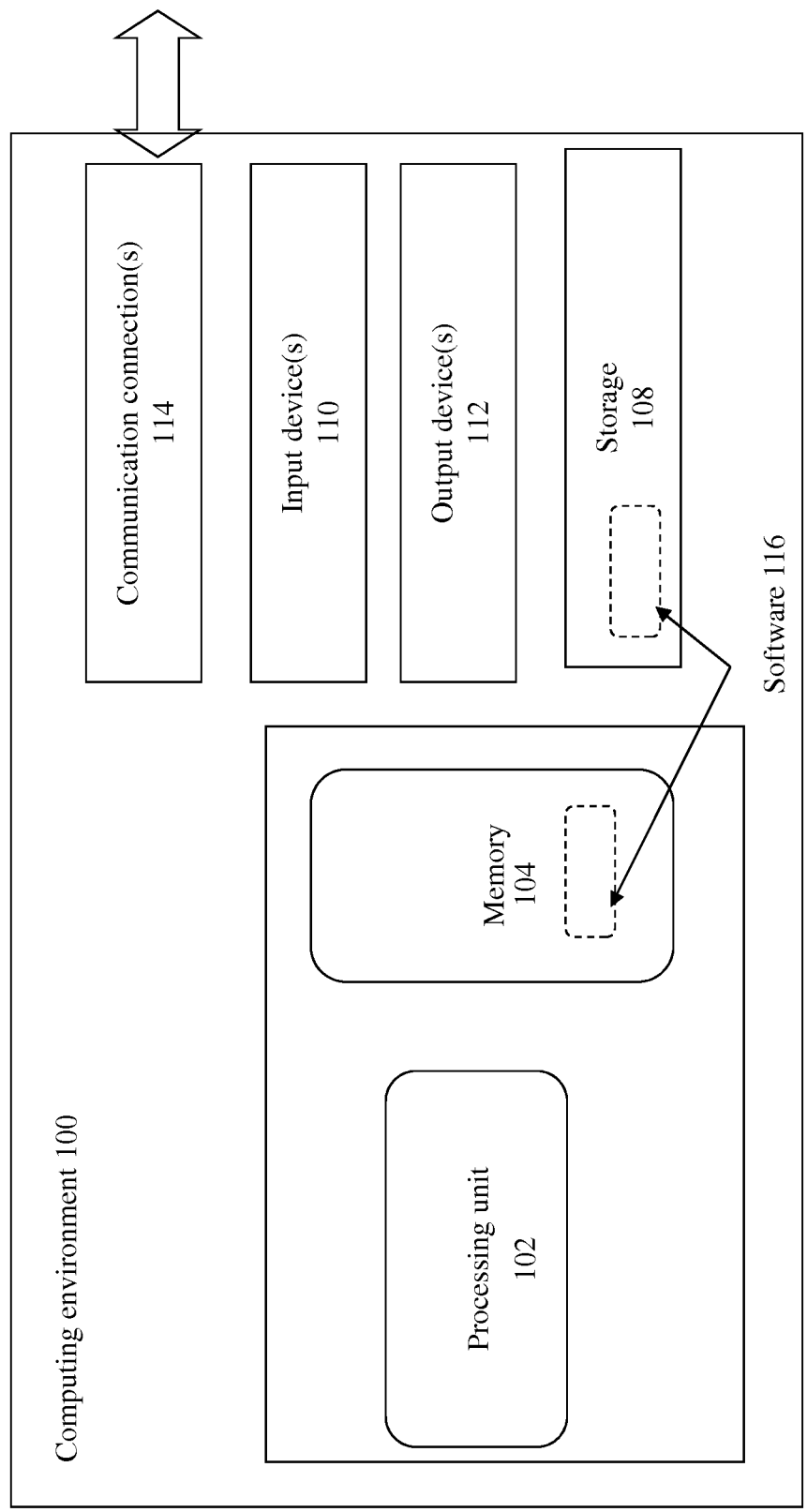
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
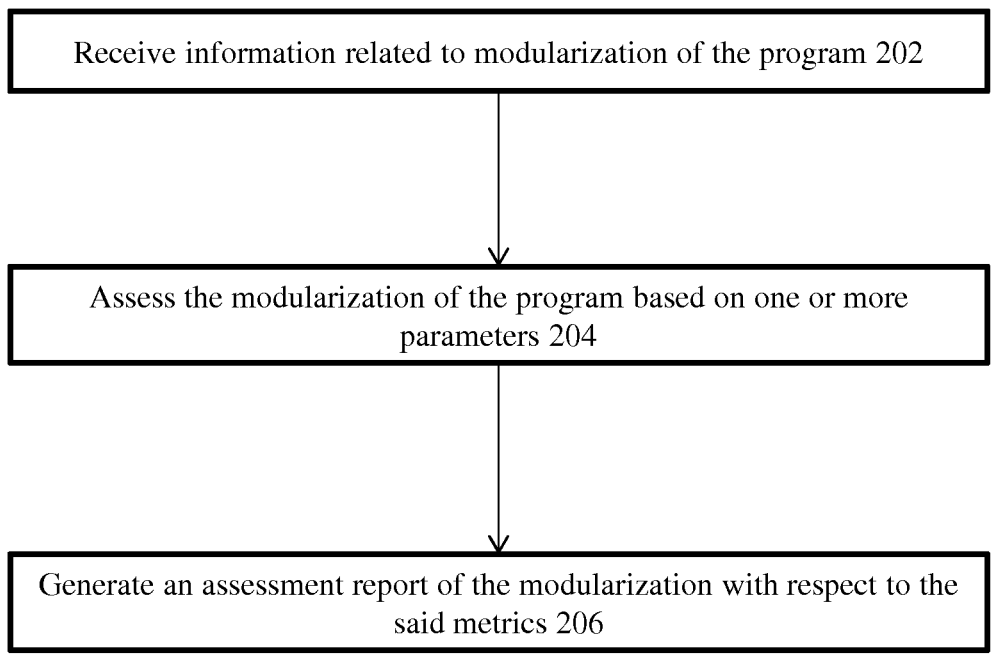
FIG. 2 is a flowchart, illustrating a method for assessing modularity of a program written in an object oriented language, in accordance with an embodiment of the present invention.

FIG. 2 is a flowchart, illustrating a method for assessing modularity of a program written in an object oriented language, in accordance with an embodiment of the present invention. This technique can be used for any language which supports object encapsulation, partial classes, class extension, delegates and usage of static variables. One of those languages which support the above mentioned features is C# programming language. For the purpose of describing the present technique, C# programming language is taken as an example but the present technique does not limited to C# programming language only. The C# programs are modularized into set of modules, each containing set of files, so that the resulting modularization can be assessed using the Modularity Metrics proposed in this disclosure. The modularization information of the object oriented program (or C# program) is received, as in step 202. Thus, once the modularization details are updated in the system, the metrics calculator fetches the same from the database. The modularization of the object oriented program (or C# program) is assessed by calculating object encapsulation metrics, partial types metrics, extension method metrics, delegates metrics and static variable usage metrics, as in step 204. The metadata of the C# programs are extracted to leverage the same for computation of the metrics. Each metric values between 0 and 1. Any value close to 1 means the specific module is doing fine with respect to the features measured by the metric. The details of determining the metrics are discussed herein below. An assessment report of the modularization is generated with respect to the said metrics, as in step 206. The generated report is static HTML report detailing the modules' metrics and the entities having violation with respect to the metrics.

Modularity Metrics:

The following notations will be used in this disclosure to represent the different metrics: The software system is expressed by S which consists of a set of modules $\wp = \{p_1, \ldots, p_M\}$ where each p is one system module. The set of all classes in system S will be represented by $C$, whereas C(p) will express the subset of the classes contained in module $p \in \wp$. M will be used to represent the set of all methods or functions within the system. M(c) shall express the set of methods defined in class $c \in C$, and extending the notation, M(p) will be used to denote the set of functions defined in module $p \in \wp$. Inversely, Mod(c) will be the module in which class $c \in C$ resides, while Mod(m) shall be the module in which the function $m \in M$ resides. The binary operator denoting whether or not there is a call from within the function m to the function m' will be called Call (m,m'), while the N Calls (m,m') will yield the number of calls to m' from m. Similarly, the existence of a use of m' as a parameter in a function call, within m, shall be FOC (m,m'). The operator InUse(m) analyzes if a method may be called during program execution (belongs to the execution tree). Pure(m)=1 means m does not use any output methods, or modify variables outside its own scope. ImplicitConv(m,f) counts the amount of times within method m that an implicit conversions takes place, applying an implicit conversion function $f$.

Object Encapsulation Metrics:

Among the guidelines for the C# design, object encapsulation is a main concern. The use of private protected variables is encouraged, offering access to them only through properties, accessors and setters. Clearly, when accessing information through a getter, there should be no changes to the state, otherwise, an external party using the accessor, without knowledge of how it has been implemented, might use it in an unintended way, modifying the state unintentionally.

This situation is clearly undesirable in a properly modularized program, therefore, a State Mutating Accessor metric is defined to show how many of the explicitly defined accessors modify states. Using the notation Acc(S) to denote all the accessors explicitly defined in the software system and VarNonLocalAssig(m) for the amount of modified variables that do not belong to the private scope of method m, it is defined:

$$SMA = 1 - \frac{|\{m \in Acc(S) \mid VarNonLocalAssig(m) \neq 0\}|}{|Acc(S)|}$$

Partial Types Metrics:

Both when working on a large project, and when making use of automatically generated code, it can be desirable to split a class definition over more than one source files. (Kindly note that this feature is not available in Java.) For this, C# offers the Partial Types. While it may be a useful tool for the development stage, it is important, for a proper modularization of the code, to minimize the amount of types defined across the modules. The language designers already set certain restrictions to the use of this tool, demanding all partial declarations work on the same namespace and are share the assembly. Nevertheless, while being a proper limitation in order to obtain a working program, it may not be enough to ensure properly modularized code, since it would be possible to share the namespace across a big multi module project, and, as long as it uses a single assembly, the programmer can spread partial definitions across the entire project. Clearly, having to look in different modules for parts of a class is not a desirable trait for a modularized program, so an Intermodule Type Definition Index (ITDI) is defined for a given module p, as the ratio between the classes with partial definitions in both p and a different module p', over the amount of classes defined in p:

$$ITDI(p) = 1 - \frac{|\{c \in M(c) \mid \exists_{p' \in \wp} \text{Part}(c, p) \land \text{Part}(c, p') \land p' \neq p\}|}{|M(c)|}$$

Here, Part(c,p) will be used to indicate that there is a definition of class c with a partial modifier in module p.

This metric may be extended to entire system by taking an average across all the modules:

$$ITDI(S) = \frac{1}{|\wp|}\sum ITDI(p)$$

Extension Method Metrics:

Another tool to improve the language flexibility is the concept of extension methods. These allow a client to extend a class provided by a supplier without having to either modify it or inherit from it, but rather defining his own separate extension methods. This is also the only way to extend a sealed class, which cannot be inherited from. Once again, the problem for modularization comes when the extended methods and the class reside in different modules. To analyze this problem the Intermodule Extension Method Usage (IEMU) is created, which has two different parts. For this formulae Ext(m,c) is used to imply that method m extends class c. First, the proportion of the methods of a module p is considered which extend classes outside p (IEMU1):

$$IEMU_1(p) = 1 - \frac{|\{m \in M(p) \mid \exists_{c \in C} \text{Ext}(m, c) \land \text{Mod}(c) \neq p\}|}{|M(p)|}$$

Secondly, the ratio between the classes in package p is considered that are extended by external methods over the total amount of classes in p (IEMU2):

$$IEMU_2(p) = 1 - \frac{|\{c \in C(p) \mid \exists_{m \in M} \text{Ext}(m, c) \land \text{Mod}(m) \neq p\}|}{|C(p)|}$$

Finally, the IEMU metric is obtained for module p as the minimum between the two:

IEMU(p)=min{IEMU$_1$,IEMU$_2$}

To generalize to the entire system the average of it is determined over all modules:

$$IEMU(S) = \frac{1}{|\wp|}\sum IEMU(p)$$

Delegates:

In a similar fashion to the function pointers used in C++, C# offers a system to pass a function as a parameter, which is much more type safe and less likely to produce run time type errors. This tool is the Delegate.

A Delegate type is declared as the prototype of a function, meaning which parameters it receives and what it returns. A function can receive, as a parameter, a previously delegate type. If so, when the function is called the name of a function that complies with the delegate declaration can be passed as the parameter, which creates an immutable delegate "pointing" to this function. Within the calling function, every time the delegate is used, the function linked to it is called. To add multicast functionality, a single delegate can be linked to multiple methods, calling them in chain whenever it is summoned.

This is useful both for functional programming first order functions, but also for improving modularization. It is much clearer and easier to modify a module that assigns external methods to delegates and then does all the internal work with those delegates than one which directly calls on the external methods all though out the code. The delegate, here, would act as a decoupling mechanism between the module providing the called function and the one using it, much in the same way published APIs and Interfaces do. Therefore, a metric is proposed to measure the extent to which this tool is used to channel the intermodule traffic, called Delegate Usage Index (DUI). It will be defined as the ratio between the times an external function is called through a delegate associated to it and all calls to external functions, both direct and through delegates. Notably, since delegates can be dynamically assigned, a call to a delegate might result, at runtime, in a call to an internal or an external function, but, since exclusively static code analysis is done, the "external call" is considered the use of a delegate with the potential of pointing to an external function.

$$DUI(p) = \frac{\sum_{m_j \in M(p)} \sum_{f_k \in \{M - M(p)\}} N\text{Calls}(m_j, \text{Del}(f_k))}{\sum_{m_j \in M(p)} \sum_{f_k \in \{M - M(p)\}} (N\text{Calls}(m_j, \text{Del}(f_k)) + N\text{Calls}(m_j, f_k))}$$

Here, Del(f) refers to a delegate which may be assigned to method f, during the program execution.

The index can be extended to review the usage of delegates as decoupling mechanisms throughout the system by:

$$DUI(S) = \frac{1}{|\wp|}\sum DUI(p)$$

Static Variable Usage:

C#, like Java, provides static variables for maintaining information at the class level, along with the class definition which provides variables for defining the state of the objects of the class. Static variables are supposed to be used to share information at the class level, but it can be used by other classes based on the scope defined for those static variables. Problems arise when the classes from different modules start accessing the Static variables of one module. This metric measures the same by defining two metrics, average of them will be the final value of the IMSVU metric—Inter Module Static Variables Usage metric.

Metric one M1(p) is defined as the ratio between the count of static variables of other modules accessed by module p and the count of all static variables accessed by module p.

Metric two M2(p) is defined as the ratio between the count of static variables of this module p accessed by other modules and the count of static variables defined in module p.

IMSVU(p)=(M1+M2)/2.

This can be augmented by having weighted approach based on the nature of the project, where in, two weights w1, w2 are defined whose sum will be one.

$$IMSVU(enhanced)(p) = w1*M1 + w2*M2;$$

The IMSVU for the entire system would be the average of the module level values.

$$IMSVU(S) = \frac{1}{n}\sum IMSVU(p)$$

Figure 3:
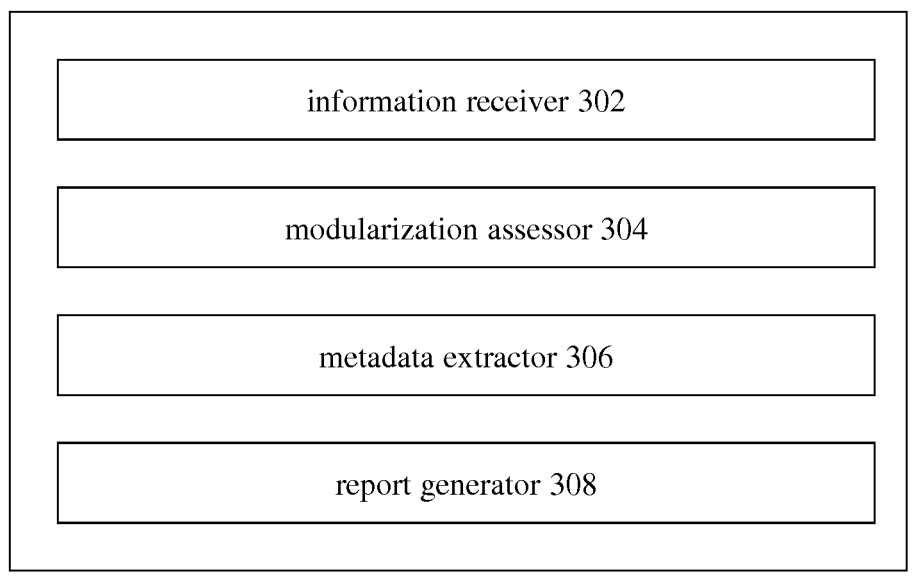
FIG. 3 is a block diagram illustrating a system for assessing modularity of a program written in an object oriented language, in accordance with an embodiment of the present invention.

FIG. 3 is a block diagram illustrating a system for assessing modularity of a program written in an object oriented language, in accordance with an embodiment of the present invention. The system includes an information receiver 302, a modularization assessor 304, a metadata extractor 306 and a report generator 308. The information receiver 302 is configured to receive information related to modularization of the program written in the object oriented language. The modularization assessor 306 is configured to assess the modularization of the program by calculating object encapsulation metrics, partial types metrics, extension method metrics, delegates metrics and static variable usage metrics. The metadata extractor 306 is configured to extract metadata of the program to calculate the said metrics. Each metric values between 0 and 1. Any value close to 1 means the specific module is doing fine with respect to the features measured by the metric. The details of determining the metrics are discussed herein above with reference to FIG. 2. The report generator 308 is configured to generate an assessment report of the modularization with respect to the said metrics. The generated report is static HTML report detailing the modules' metrics and the entities having violation with respect to the metrics.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A computer implemented method for assessing modularity of a program written in an object oriented language, comprising:
   receiving, by a processor, information related to modularization of the program written in the object oriented language;
   extracting, by the processor, metadata of the program;
   assessing, by the processor, using the extracted metadata, the modularization of the program by calculating object encapsulation metrics, extension method metrics comprising one or more metrics that measure the extent to which extension methods, that extend classes without modifying the classes and without inheriting from the classes, and the classes extended by the extension methods are defined in different modules, and static variable usage metrics, wherein each of the said metrics range between poor modularization and optimal modularization, wherein calculating at least one of the extension method metrics comprises:
      determining a first ratio between:
         a number of methods, defined in a module, that extend one or more classes that are not defined in the module, and
         a total number of methods defined in the module;
      determining a second ratio between:
         a number of classes, defined in the module, that are extended by one or more methods that are not defined in the module, and
         a total number of classes defined in the module; and
      selecting the smallest of the first and second ratios as an extension method metric for the module; and
   generating, by the processor, an assessment report of the modularization with respect to the said metrics.

2. The method as claimed in claim 1, wherein the program comprises a plurality of modules and at least one of the plurality of modules comprises one or more classes.

3. The method as claimed in claim 1, wherein each of the said metrics has a value between 0 and 1, wherein a value of 0 denotes poor modularization and a value of 1 denotes optimal modularization.

4. The method as claimed in claim 1, wherein the report is generated in HTML form.

5. The method as claimed in claim 1, wherein the report comprises the object encapsulation metrics, extension method metrics, and static variable usage metrics of at least one module of the program and one or more entities having violation with respect to the said metrics.

6. The method as claimed in claim 1, wherein:
   an absence of extension methods results in an extension method metric value of optimal modularization.

7. The method as claimed in claim 1, wherein the assessing further comprises calculating delegates metrics that range between poor modularization and optimal modularization.

8. The method as claimed in claim 7, wherein the delegates metrics comprises one or more metrics that measure a ratio between:
   a number of calls made in a module to external functions via one or more delegates, and
   a total number of calls made in a module to external functions.

9. A system for assessing modularity of a program written in an object oriented language comprising:
   a processor in operable communication with a processor readable storage medium, the processor readable storage medium containing one or more programming instructions whereby the processor is configured to implement:
   an information receiver, wherein the information receiver receives information related to modularization of the program written in the object oriented language;
   a metadata extractor, wherein the metadata extractor extracts metadata of the program;
   a modularization assessor, wherein the modularization assessor, using the extracted metadata of the program, assesses the modularization of the program by calculating object encapsulation metrics, extension method metrics, and static variable usage metrics, wherein the metrics range between poor and optimal modularization, wherein calculating at least one of the extension method metric comprises:
      determining a first ratio between:
         a number of methods, defined in a module, that extend one or more classes that are not defined in the module, and
         a total number of methods defined in the module;

determining a second ratio between:
  a number of classes, defined in the module, that are extended by one or more methods that are not defined in the module, and
  a total number of classes defined in the module; and
selecting the smallest of the first and second ratios as an extension method metric for the module; and
a report generator, wherein the report generator generates an assessment report of the modularization with respect to the said metrics, wherein the assessment report indicates at least one modularization violation that comprises a non-optimal extension method metric value which indicates that at least one extension method, which extends a class without modifying the class and without inheriting from the class, is defined in a different module than the class extended by the extension method.

10. The system as claimed in claim 9, wherein the program comprises a plurality of modules and at least one of the plurality of modules comprises one or more classes.

11. The system as claimed in claim 9, wherein each of the said metrics has a value between 0 and 1, wherein a value of 1 denotes optimal modularization.

12. The system as claimed in claim 9, wherein the report is generated in HTML form.

13. The system as claimed in claim 9, wherein the report comprises the object encapsulation metrics, extension method metrics, and static variable usage metrics of at least one module of the program and one or more entities having the modularization violation with respect to the said metrics.

14. A non-transitory computer readable medium having stored thereon instructions for assessing modularity of a program written in an object oriented language, comprising machine executable code which when executed by at least one processor, causes the at least one processor to perform steps comprising:
  receiving information related to modularization of the program written in the object oriented language;
  extracting metadata of the program;
  assessing, using the extracted metadata, the modularization of the program by calculating object encapsulation metrics, partial types metrics, extension method metrics comprising one or more metrics that measure the extent to which one or more extension methods, that extend one or more classes without modifying the one or more classes and without inheriting from the one or more classes, and the one or more classes extended by the one or more extension methods are defined in different modules, delegates metrics, and static variable usage metrics, further wherein calculating at least one of the extension method metrics comprises:
    determining a first ratio between:
      a number of classes, defined in a module, that are extended by one or more extension methods that are not defined in the module, and
      a total number of classes defined in the module;
    determining a second ratio between:
      a number of methods, defined in the module, that extend one or more classes that are not defined in the module, and
      a total number of methods defined in the module; and
    selecting the smallest of the first and second ratios as an extension method metric for the module; and
  generating an assessment report of the modularization with respect to the said metrics, wherein the assessment report indicates that at least one class is extended by at least one extension method defined in a different module than the at least one class.

15. The non-transitory computer readable medium as claimed in claim 14, wherein the program comprises a plurality of modules and at least one of the plurality of modules comprises one or more classes.

16. The non-transitory computer readable medium as claimed in claim 14, wherein the report comprises the object encapsulation metrics, partial types metrics, extension method metrics, delegates metrics, and static variable usage metrics of at least one module of the program and one or more entities having violation with respect to the said metrics.

* * * * *